May 4, 1954    J. J. ARPS    2,677,790
BOREHOLE LOGGING BY INTERMITTENT SIGNALING
Filed Dec. 5, 1951    2 Sheets-Sheet 1

INVENTOR,
JAN J. ARPS
BY
Lyle Dillon
ATTORNEY

May 4, 1954   J. J. ARPS   2,677,790
BOREHOLE LOGGING BY INTERMITTENT SIGNALING
Filed Dec. 5, 1951   2 Sheets-Sheet 2
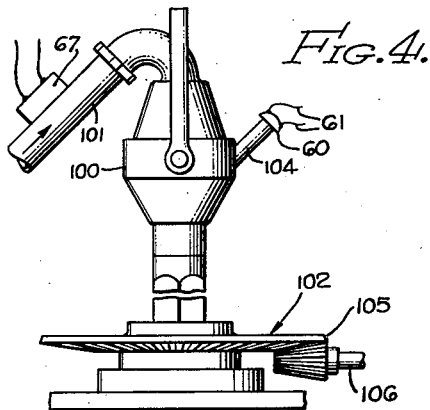
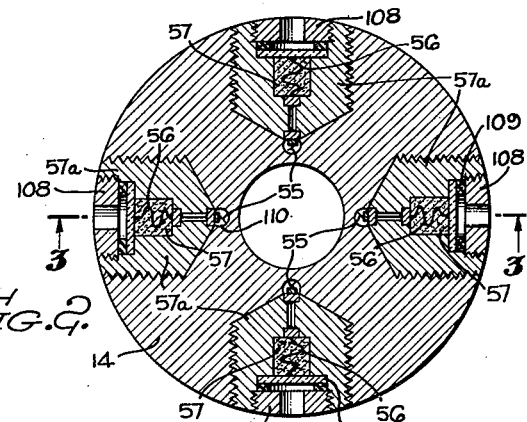
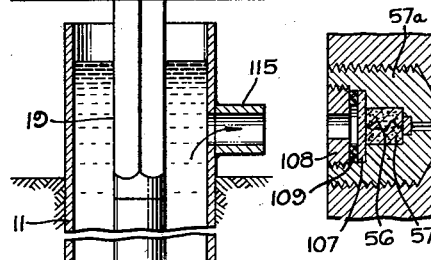
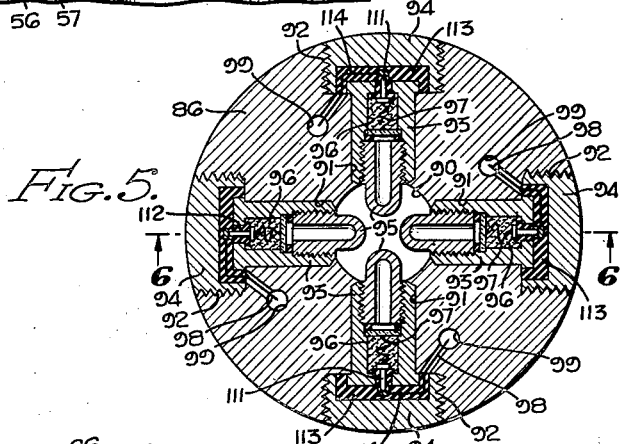
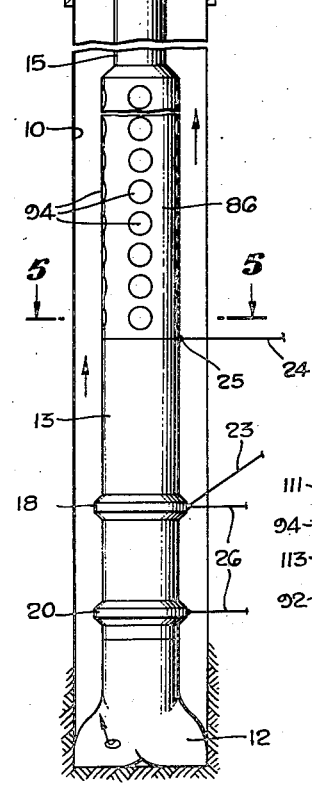
INVENTOR,
JAN J. ARPS
BY
Lyle Dillon
ATTORNEY Patented May 4, 1954

2,677,790

UNITED STATES PATENT OFFICE 2,677,790

BOREHOLE LOGGING BY INTERMITTENT SIGNALING

Jan J. Arps, Tulsa, Okla.

Application December 5, 1951, Serial No. 260,028

15 Claims. (Cl. 324—1)

This invention relates in general to the logging of earth boreholes and more particularly to methods and apparatus for the substantially simultaneous electrical logging and drilling of well boreholes.

In the conventional method of electrical logging of earth boreholes as heretofore usually practiced, a source of electric current is located at the surface outside of the borehole, and a current therefrom is applied through a suitably insulated conductor cable extending into the borehole to spaced electrodes therein and thence to a portion of the penetrated geological strata to be explored, and the results of such exploration transmitted in the form of electrical measurements back through the same or separated insulated conductors in the cable to suitable indicating or recording apparatus at the earth's surface. The provision of such insulated conductors in a drilling well, together with the drill pipe, in such manner that drilling and electrical logging operations could be carried on simultaneously, has been found to be impracticable. Therefore, the usual well logging practice has been to interrupt the drilling operations at intervals to permit the removal of the drill pipe from the borehole and the running of the before-mentioned conventional logging apparatus suspended from the conductor cable within the borehole during the time the drill pipe is removed.

The before-described conventional logging practice has the disadvantage that the precise control, at all times, of the depth of drilling with respect to certain formations is difficult, with the result that in many cases the desired shale body or the candidate productive formation may have been drilled through or passed up between the logging operation intervals, thereby possibly necessitating subsequent time-consuming and expensive corrective measures before the next intended step in the process of continued drilling or completion of the well can be undertaken.

Another disadvantage in the before-described intermittent method of electrical logging resides in the well known fact that the liquid from the drilling fluid invades the penetrated formations surrounding the borehole, thereby changing the electrical characteristics of such formations for a substantial distance laterally from the borehole axis. Such invasion is progressive with time, and, if permitted to continue for an appreciable length of time, results in sufficient contamination of the formations to cause possible confusion in the correct interpretation of the electrical characteristics of the formations thus measured.

The before-described difficulties are largely overcome by the present invention, which does not require an insulated conductor cable in the borehole at any time, but provides for the transfer of the results of the electrical logging operations, or other similar measurements made within the borehole, to the earth's surface without employing the usual interconnecting insulated conductors, and this is accomplished while the drill pipe is within the well borehole and substantially continuously during drilling operations. The system of the present invention permits the electrical logging or other measuring apparatus to be contained within the lower end of the drill stem, and the process of making the actual logging measurements to be carried on there simultaneously with the drilling of the borehole, whereby the electrical logging measurements can be made of the freshly penetrated formations before excessive invasion of drilling fluid into the formations takes place.

Another advantage of the present invention resides in the close approximation to simultaneous drilling and logging of a formation which it makes possible, thereby permitting a more continuous and more accurate determination of the depth of the borehole, relative to the formations penetrated thereby, than is possible by the alternate drilling and logging operations heretofore usually employed.

Accordingly, an object of this invention is to provide a method and apparatus for logging earth boreholes in which the necessity for using an insulated conductor extending into the borehole to the logging apparatus is avoided.

Another object of this invention is to provide a logging system which permits the conducting of logging measurement operations and drilling operations simultaneously.

Another object of this invention is to provide a system for transmitting the well logging measurement information previously made, from a point within a well borehole to a point at the surface outside of the borehole, at a rapid rate during any relatively short interval of time while drilling is temporarily suspended but while the drilling tools and drill pipe remain within the borehole.

The objects of this invention are attained, in brief, by utilizing electrical logging methods for detecting and measuring the variations in the earth characteristics at a point in the borehole adjacent the drill bit while the drilling is in progress, making an immediate and continuous storage or recording of the logging measurement data thus obtained by suitable means located in the drill stem adjacent the drill bit, and then during suitable periods when the drilling is temporarily interrupted for some reason, such as for the addition of drill pipe stands or the like, converting the recorded or stored logging data into sound or pressure wave impulses in the drilling fluid by means located at the lower end of the drill stem and at a relatively rapid rate, and receiving and translating these impulses at the earth's surface into suitable electrical signals indicative of the measurements made within the well, for recording on a chart in correlation with the depth of the corresponding drilling operations.

Other objects, advantages, and features of novelty will be evident hereinafter in the more detailed description of the invention.

In the drawings, which illustrate preferred embodiments and modes of operation of the invention, and in which like reference characters designate the same or similar parts throughout the several views:

Figure 2 is an enlarged cross-sectional view taken on line 2—2 of Figure 1;

Figure 3 is a fragmentary longitudinal-sectional view taken on line 3—3 of Figure 2;

Figure 4 is a vertical-sectional view through a typical well borehole showing a modified form of the apparatus of the invention;

Figure 5 is an enlarged cross-sectional view taken on line 5—5 of Figure 4; and

Figure 6 is a fragmentary longitudinal-sectional view taken on line 6—6 of Figure 5.

Figure 1:
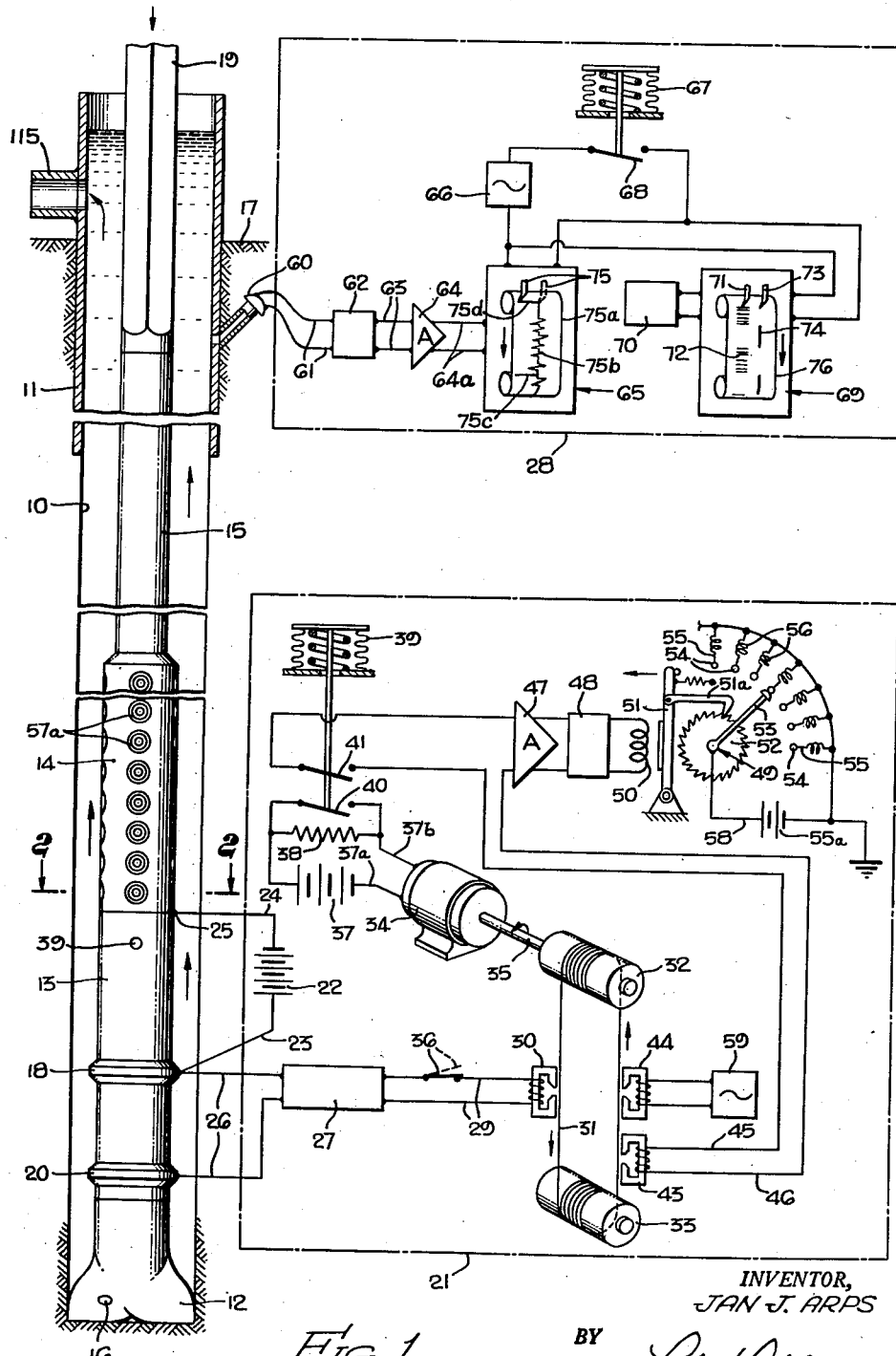
Figure 1 is a vertical-sectional-elevational view of a typical well borehole showing the general arrangement of the apparatus of the invention partially in elevation and partially diagrammatically.

The apparatus is as follows:

Referring first primarily to Figures 1, 2, and 3, a longitudinal section of a typical well borehole is shown, by way of example, having a lower uncased portion 10 and an upper portion in which a surface string of casing 11 has been set, in accordance with conventional practice. Within the borehole is shown conventional rotary drilling apparatus comprising a drill bit 12 and a drill stem or drill pipe 15 connected at its upper end through a square kelly 19 to a swivel 100 (Fig. 4), which is in turn supported by conventional well derrick apparatus (not shown), which usually includes a hook suspended from a suitable traveling block. The square kelly 19 passes through conventional gripping means in a rotary table 102 which is adapted to be rotated by the usual bevel gear and pinion drive, as shown at 105, which in turn is arranged to be driven in accordance with usual practice through shaft 106 by a suitable prime mover. Provision is made for circulating the usual drilling fluid by introducing it under pressure from the drilling fluid circulation pumps (not shown) through the flexible hose coupling 101 and thence through the swivel 100, kelly 19, and down through the drill pipe and passages in the drill collar hereinafter more fully described, to be discharged through the apertures 16 in the drill bit into the bottom of the borehole. The drilling fluid circulates in return from the bottom of the borehole upward through the annular space between the borehole and the drill stem to the top of the borehole, from which it is discharged through the side outlet 115 from the surface casing 11 for return to the drilling fluid sump.

The drill collar, which is attached to the lower end of the drill pipe, comprises a lower electrical logging measurement instrument-containing portion 13 and an upper signal-containing portion 14. The lower logging measurement portion 13 of the drill collar is covered in its entirety with a layer or coating of suitable insulated material, such as rubber or Bakelite, upon which is positioned a pair of annular shaped logging electrodes 18 and 20 spaced apart longitudinally with respect to each other. The electrical logging measurement recording or storage apparatus, as well as the signal generating control means, most of which is contained within suitable fluid-tight enclosures within the lower portion 13 of the drill collar, are illustrated diagrammatically within the dotted rectangular enclosure 21 of Figure 1. The electrical logging measurement portion of the apparatus comprises a suitable source of electric current, such as battery 22, having one terminal thereof connected through an insulated conductor 23 to one of the annular electrodes, which may be electrode 18, and the other terminal connected through an insulated conductor 24 to a suitable terminal within the upper portion of drill collar 13, which in effect makes grounded electrical connection to the upper portion 14 of the drill collar and therethrough to the drill stem thereabove. If desired, a suitable source of relatively low frequency alternating current may be substituted for battery 22, whereby an alternating current or a periodically reversed D. C. potential may be applied between the annular electrode 18 and the balance of the drill stem in a manner well known in the electro-logging art. For example, a periodically reversed current may be applied between the electrode 18 and the drill stem through conductors 23 and 24 in the manner more fully described in the copending Arps application Serial No. 185,849. A more complete illustration of one method of construction of the drill collar portion 13 providing for the insulating support of annular electrodes 18 and 20 is also shown in the aforesaid copending application. Electrodes 18 and 20 are connected through conductors 26 to the input of electrical apparatus 27 capable of producing at its output terminals electrical pulses having a frequency which bears a predetermined functional relationship to the potential applied to the input thereof through the before-mentioned conductors 26. The output of the electrical apparatus 27 is connected through conductors 29 and switch 36 to the windings of a recorder head 30 of a magnetic wire recorder apparatus hereinafter more fully described. The electrical apparatus included within the apparatus 27 may comprise an electron oscillator, the frequency of which is controlled by means of a reactance electron tube circuit, which is in turn controlled by the potential applied thereto, such as the potential applied through conductors 26. Such an oscillator controlled by means of the reactance tube is well known in the electronics art for producing frequency modulation, and one example thereof may be found in "Theory and Application of Electron Tubes" by H. J. Reich (McGraw-Hill), 2nd Edition, 1944, page 212. A typical example of a reactance tube circuit which may be employed in connection with the before-mentioned electron oscillator may be found on page 414 of the before-mentioned reference publication.

The magnetic recorder or signal storage apparatus hereinbefore referred to in connection with the recording head 30 includes a continuous loop of magnetic recording wire 31 which extends between and makes a plurality of turns on each of a pair of spools or drums 32 and 33, one of which is driven through shaft 35 by a motor 34. While a relatively few number of turns of the recording wire 31 are shown on each of the drums or spools 32 and 33, it is to be understood that in the actual construction of this apparatus the magnetic wire 31 would be of sufficient length to provide for several hours of recording operation, and that accordingly the number of turns of the wire on the spools or drums 32 and 33 would be that required to retain such length of wire. Switch 36 is adapted to be operated by the weight applied to the drill bit 12 through the drill stem by suitable means such as a strain gauge (not shown) such that upon the application of predetermined weight the switch will be closed, and upon lifting of the weight from the drill bit 12 the switch will be opened.

Motor 34 is energized by suitable means such as battery 37, which is connected thereto through conductors 37a and 37b and resistance 38. The resistance 38 is adapted to be shorted or shunted out by means of a switch 40 which is coupled for actuation to a drilling fluid differential pressure switch actuator 39, which in turn is adapted to be suitably positioned at the point indicated at 39 in the drill collar portion 13 so as to be subjected to the difference in fluid pressure between the drilling fluid within the circulation duct in the center of the drill collar portion 13 and that in the annular space between the drill collar and the surrounding borehole wall. Thus, the maintenance of the usual rate of flow of the drilling fluid will impose sufficient differential pressure on the actuator 39 to maintain the switch 40 open, whereas cessation of circulation of the drilling fluid with a resultant drop of differential pressure across the actuator 39 will permit the switch 40 to close. Another switch 41, also coupled to the actuator 39, partakes of the same operation as switch 40 such that switch 41 opens when normal fluid circulation is maintained, but closes when the circulation is stopped.

A magnetic pick-up head 43 is positioned adjacent the loop of recording wire opposite to that of the recording head 30. The windings on recording head 43 are connected through conductors 45 and 46 and through switch 41 to an amplifier 47. The output of amplifier 47 is connected to the input of a scaling circuit 48, and the output of the scaling circuit is connected to the windings of an electromagnet 50 of a magnetically operated ratchet switch 49.

The electron scaling circuit 48 is capable of receiving the electrical pulsations from the beforementioned amplifier 47, and producing output pulsations to electromagnet 50, in response thereto, having a frequency which is much lower than the input pulse frequency but bearing a predetermined ratio thereto. Such scaling circuits are well known in the art, a typical example thereof being shown in "Procedures in Experimental Physics" by J. S. Strong (Prentice-Hall, Inc.), 1st Edition, 1938, page 228.

The ratchet switch 49 includes an armature 51 adjacent to and adapted to be actuated by the electromagnet 50, and a pawl 51a pivotally attached adjacent the upper end thereof and adapted to make one-way ratcheting engagement with a toothed ratchet wheel 52. The shaft of the toothed ratchet wheel 52 carries fixed thereto a radial contact arm 53, which in turn is adapted upon rotation with the ratchet wheel 52 to make sequential electrical contact with each of a plurality of contact points 54 which are spaced apart on the arc of a circle concentric with the shaft of the switch 49. Each of the contact points 54 is connected by a suitable insulated conductor, as shown at 55, to one of a plurality of ignition filaments 56 of a plurality of explosive cartridges 57 (Figs. 2 and 3), each of which is adapted to be contained in a replaceable plug 57a threaded into suitable sockets in the outside surface of the upper signal-containing portion 14 of the drill collar, as best shown in Figures 2 and 3. Each of the ignition filaments 56 is grounded at the outer end through a frangible metal diaphragm 107 which serves as a fluid-tight closure for the outer ends of the sockets containing the cartridges 57. Each metal diaphragm 107 is held in place by means of an annular nut 108 and an intermediate annular gasket 109.

The several conductors 55, which make electrical connection between the switch contact points 54 and the several ignition filaments 56, extend through longitudinal ducts 110 which interconnect the upper and lower portions 13 and 14, respectively, of the drill collar. For the purpose of simplification of illustration, only one conductor 55 is shown in each duct 110.

A suitable source of electric current, such as the battery 55a, has one terminal thereof connected through conductors 58 to the switch arm 53, and the other terminal thereof connected to the common grounded terminal of each of the ignition filaments 56 which, as hereinbefore described, is through the conductive body of the drill collar and through the metal discs 107.

An erasing head 44 is positioned adjacent the reproducing head 43 and in such position relative to the recording wire 31 as to erase the magnetically recorded measurement material from the wire 31 after it has passed over the reproducing head 43. A suitable source of alternating current 59 is provided for energizing the windings of the erasing head 44.

The apparatus for receiving and recording the signals transmitted from the hereinbefore-described apparatus 21 within the drill collar to the top of the well, as will be more fully described hereinafter in connection with the operation of the apparatus, is shown diagrammatically within the rectangular dotted-line enclosure 28. This apparatus includes a microphone 60 which is connected through a short length of pipe to a side opening in the surface casing 11 below the fluid level therein and preferably, although not necessarily, at a sufficient distance under the surface of the earth to be relatively free of engine and exhaust noises. The output of the microphone 60 is connected through conductors 61 to a suitable band pass type noise filter 62, and from there through conductors 63 to an amplifier 64. The filter 62 is designed to have a band pass characteristic such as to accentuate the frequencies associated with the signal explosive impulses while suppressing those associated with the usual noises of the surface rotary drilling machinery which may be in operation during reception of signals. The output of the amplifier 64 is connected through conductors 64a to a recorder 65.

The recorder 65 may be any one of a number of well known devices in which a pen 75 is moved laterally with respect to a recording chart 75a in response to electrical input signals or impulses to plot such signals or impulses graphically, as illustrated at 75b. When the driving means is energized, the chart 75a is adapted to be moved relative to the pen 75 in the direction indicated by the arrow at a suitable, constant speed by means of a motor (not shown) which obtains its energizing current from an alternating current source 66.

A switch 68 is provided for controlling the intermittent flow of the before-mentioned alternating current from the source 66 to the driving means for the chart 75a and for modifying the action of pen 75 of recorder 65, and for actuating pen 73 of a second recorder 69, as will be more fully described. The switch 68 is coupled for actuation by means of a differential fluid pressure actuator 67 which may take the form of a metal bellows device and may be located, as shown in Figure 4, on and in communication with the fluid within the connection 101 leading to the swivel 100. The actuator 67 is arranged to maintain the switch 68 open, as shown, while the circulation of drilling fluid is maintained, but to close switch 68 when such fluid circulation is stopped or interrupted for any reason.

Recorder 69 is similar to recorder 65, having a strip chart 76 adapted to be moved continuously, by means not shown, in the direction shown by the arrow at a constant speed but preferably at a low speed relative to that of the chart 75a of recorder 65, and having two pens 71 and 73. Chart 75a of recorder 65 is driven intermittently during the times switch 68 is closed, while chart 76 of recorder 69 is driven continuously without interruption.

A borehole depth meter 70 is connected with recorder 69 and serves to actuate pen 71 to make a lateral mark, as shown at 72 on the chart, for each additional unit increase in total depth of the well borehole. For example, the depth meter 70 may be arranged to cause the pen 71 to make a mark such as shown at 72 on the chart 76 for each additional foot of borehole depth made by the drilling operations. Apparatus which may be adapted to perform the service of the depth meter 70 is shown in Figures 2, 3, and 4 of the copending Arps application Serial No. 90,503, filed April 29, 1949.

The second pen 73 of the recorder 69 is, as before-mentioned, connected to the electrical circuit from the power supply 66 as controlled by the switch 68 in such a manner as to make longitudinal marks on chart 76, as indicated at 74, during each time interval during which the switch 68 is closed. A record is thereby made on the chart 76 indicative of the alternate, mutually exclusive time intervals during which drilling is in progress and during which the signal circuit and the receiving circuit were activated. Thus, during the time intervals indicated by the length of lines 74 on chart 76, the drilling operations are suspended and the signaling apparatus 21 and the receiving apparatus 28 are activated. During the time intervals intermediate the ends of lines 74, drilling operations are in progress, the signaling and receiving apparatus 21 and 28, respectively, are inactivated, and borehole drilling progress is meanwhile being made, as indicated by the depth increase indicating lines 72 made by pen 71. For convenience of illustration, these alternate time intervals are shown on chart 76 as approximately equal in length, but actually the time intervals during which drilling is in progress, as represented by the longitudinal extent of the groups of lines 72, would be much longer than those during which drilling is suspended and the signaling operations are in progress, as represented by the length of lines 74.

Referring now primarily to Figures 4, 5, and 6, in which a modified form of the apparatus of this invention is shown, all of the apparatus is substantially the same as that hereinbefore described in connection with Figure 1 except the signal-containing portion of the drill collar. In the modified form of the apparatus shown in Figures 4, 5, and 6, the signal-containing portion 86 of the drill collar, instead of having the signal explosive plugs 57a containing the explosive cartridges 57 facing outwardly and adapted to discharge radially into the annular space surrounding the drill collar, as shown in Figures 1, 2, and 3, has the signaling units 93 containing the signal explosive charges 96 arranged, as best shown in Figure 6, to discharge inwardly and upwardly into the central drilling fluid circulating duct 90 within the drill collar. The signal-containing portion 86 of the drill collar is provided with a plurality of rows of radial bores 91 extending through the walls thereof into the before-mentioned circulating duct 90. Each signal unit, as shown at 93, is positioned in a bore 91 and secured therein by means of a plug 94 which is threaded, as shown at 92 into the outer enlarged end of the bore. Each signal unit 93 carries a barrel member 95 threaded into the forward end thereof and having a passage which extends into and faces upwardly within the fluid duct 90 as shown at 95a. The explosive charge chamber in the rearward portion of each signal unit 93 is closed and sealed fluid-tight by means of a metal disc 96a which is held in place by means of a gasket and the inner threaded end of the before-mentioned barrel member 95. An ignition filament 97 extends between the grounded metal disc 96a and a suitable electrical contact pin 111 which extends through a suitable insulating bushing 112, the outer end thereof being seated in a cup-shaped insulating member, as shown at 113. An insulated lead wire 114 extends from the electrical connection with the said outer end of the pin 111 through a suitable lateral passage in the insulating member 113 and from there, as indicated at 98, into a longitudinal ignition conductor duct 99, which, as in the case of the ignition ducts 55 shown in Figures 2 and 3, extends longitudinally from the signaling portion 86 of the drill collar down into the lower instrument-containing portion 13 of the drill collar. Each of the electrical conductors 114, as before stated, extends downwardly, as indicated at 98, from each of the signal units through ducts 99 into the lower portion 13 of the drill collar, where it makes electrical connection with one of the switch contacts 54 of the before-described stepping switch 49.

In connection with the latter-described apparatus of Figures 4, 5, and 6, the microphone to be used in connection with the receiving and recording apparatus shown in the dotted enclosure 28 is preferably, although not necessarily, located as shown at 60 in Figure 4, at the end of a short tubular connection 104 which is in communication with the drilling fluid duct within the swivel 100. The microphone 60 may, however, be located as shown in Figure 1 in conjunction with the apparatus arrangement shown in Figure 4. Other locations of the microphone may be employed, such locations, as in Figures 1 and 4, being such as to maintain the microphone in substantially direct communication with the drilling fluid either within the drill stem or within the borehole. The microphone 60 is provided with conductors 61 which make electrical connection with the amplifier 62 of the before-described recording apparatus within the enclosure 28.

The operation of the apparatus is as follows:

With the drilling tools in place within the borehole 10, as illustrated in Figures 1 and 4, rotary drilling operations may be first assumed to be in progress. Under such conditions, the drilling fluid may be assumed to be being circulated by means of the drilling fluid circulating pumps, the flow of the circulating drilling fluid being into the top of the swivel 100 through connection 107 and down through the swivel 100, the kelly 19, drill pipe 15, through the central ducts of the upper and lower portions 14 and 13, respectively, of the drill collar, and out through the apertures 16 in the drill bit 12, and thence upward in the annular clearance space between the drill stem and the inside wall of the borehole to the casing 11, and from there through the side outlet 115 and return to the drilling fluid suction pit from which the circulating pumps take suction. Under these conditions, the fluid pressure in the connection 101 will be sufficiently high to cause the actuator 67 to maintain switch 68 open, thereby maintaining the recorder 65 inactive with the chart 75a stationary and the pen 75 at its extreme position at the left-hand edge of the chart, and pen 73 of recorder 69 will be lifted off the chart 76. During this time the recorder 69 continues to run, driving the chart at constant speed, with the depth measuring device 70 actuating pen 71 to record, as shown at 72, each foot of increase in depth of the borehole. At the same time the differential fluid pressure between the internal fluid circulating duct of the drill stem and the external annulus will be sufficient to cause the actuator 39 to maintain switches 40 and 41 open, as shown. Also, with the bit 12 in drilling position on bottom, the weight applied to the bit for such drilling will be sufficient to cause switch 36 to be closed by the strain-actuated mechanism hereinbefore described.

Meanwhile, battery 22 applies a potential difference through conductors 23 and 24 between the annular electrode 18 and the balance of the uninsulated portion of the drill stem, which includes the signal-containing portion 14 and the drill pipe thereabove. This potential difference results in a flow of current between the electrode 18 and the drill stem which passes through the drilling fluid in the surrounding annular space and through the adjacent portions of the formations surrounding the borehole. A portion of the resultant potential field thus established in the formations surrounding the borehole is picked up between the annular electrodes 18 and 20 in the manner well known in the electrical logging art, and this potential is conducted through conductors 26 to the input of the oscillator 27. The oscillator 27, as hereinbefore described, produces a pulsating or an alternating output signal in response to and having a frequency bearing a predetermined functional relationship to the before-mentioned input potential applied thereto through conductors 26. The aforesaid pulsating or alternating signal is, with switch 36 closed, conducted through conductors 29 to the windings of the magnetic recording head 30, with the result that magnetic signals having corresponding frequencies are transferred from the recording head 30 to the downwardly moving portion of the loop of magnetic recording wire 31.

The magnetic recording wire 31 passes between drums 32 and 33 at a relatively constant rate by reason of drum 32 being driven through shaft 35 by the electric motor 34. With switch 40 open, as hereinbefore mentioned, the current for motor 34 is supplied by battery 37 through the resistor 38. As before mentioned, sufficient turns of the recording wire 31 are provided on each of the drums 32 and 33 to provide for a suitable length of recording time approximating the duration time of the usual drilling operation intervals. At the end of each such interval of drilling time during which magnetic recordings have been made on wire 31 which comprise pulsations having a frequency indicative of the potential picked up between the pick-up electrodes 18 and 20, which are in turn indicative of the resistance of the formations surrounding the borehole adjacent such pick-up electrodes, the fluid circulation may be stopped, and the weight removed from the drill bit 12.

With the circulation of drilling fluid stopped, the drilling fluid pressure is relieved from the actuator 67, permitting the switch 68 to close, thereby energizing the driving means for the chart 75a of recorder 65 and causing pen 75 to move over from the left-hand edge position on the chart to a central position, as shown in dotted lines, and causing pen 73 of recorder 69 to be lowered into contact with chart 76. At the same time, the differential pressure of the drilling fluid being relieved from the actuator 39 in the drill collar permits switches 40 and 41 to close, and the weight being removed from the drill bit 12 also allows switch 36 to open. The opening of switch 36 deenergizes the recording head 30, and the closing of switch 40 shunts the resistance 38, thereby supplying motor 34 with an increased current from battery 37. The resistance 38 is such that upon closing of switch 40, as before mentioned, the speed of the motor 34 is increased by a predetermined amount, thereby increasing likewise by a predetermined amount the rate at which the recording wire 31 is transferred between the drums 32 and 33. Therefore, after a relatively short interval of time, during which the motor 34 drives the drums 32 and 33 at the predetermined increased speed, that portion of the recording wire 31 wound upon drum 33 and which contains the previously stored or recorded material passes from the drum 33 upward to the drum 32, and in so doing passes the reproducing head 43, resulting in electrical pulsations in conductors 45 and 46 of corresponding character but of greatly increased frequency as compared to those corresponding signals applied through conductors 29 to the recording head 30. These electrical pulsations, with switch 41 closed as before mentioned, are conducted to the input of amplifier 47, and thence into a scaling circuit 48 which, as hereinbefore described, is capable of converting the relatively high frequency input pulsations to relatively low frequency output pulsations. These low frequency or resulting intermittent output pulsations are applied to the winding of the electromagnet 50, with the result that the armature 51 is magnetically actuated at a corresponding frequency. Through the action of the pawl 51a, the ratchet wheel 52 is caused to move through a small rotational angle at each actuation of the ratchet switch, with the result that the ratchet switch contact arm 53 is progressively rotated into successive contact with the switch contact points 54. The interval of time between successive contacts between the switch arm 53 and switch contact points 54 thus becomes a function of the frequency of the electrical pulses applied from the scaling circuit 48 to the electromagnet 50, which in turn is a predetermined function of the frequency of the signal applied through conductors 29 to the recording head 30, which still further is a predetermined function of the resistance of the formations surrounding the well borehole adjacent the pick-up electrodes 18 and 20.

Each time the contact arm 53 reaches and makes electrical contact with a contact point 54, current flows from the battery 55a through the corresponding ignition filament 56 or 97 in one of the signal explosive charge units carried by the signal-containing portion of the drill stem, which may be constructed either in the manner illustrated in Figures 2 and 3 or that illustrated in Figures 5 and 6.

The resulting pressure wave in the drilling fluid upon thus firing a signal charge is transmitted upward through the well borehole either through the fluid within the drill stem or in the annulus surrounding the drill stem to the top of the well, or both, where it is picked up by the microphone 60. The resulting electrical impulse from the microphone 60 is conducted through conductors 61 through the filter 62 and thence through conductors 63 to amplifier 64. From amplifier 64 the electrical signal is conducted to the recording meter 65, causing the recording pen 75 to plot a graph on the chart 75a having lateral deflections as shown at 75b corresponding in time with each of such impulses supplied to it from the microphone. Since the chart 75a is driven during its recording operations, as hereinbefore described, at a relatively constant rate with respect to time, the distances between the lateral deflections 75b of the graph will thus be measures of the intervals of time between signal pulsations received from the signaling apparatus at the bottom of the well. The spacing of these lateral deflections 75b of the graph are, therefore, indicative of the resistance of the formations surrounding the well borehole adjacent the pick-up electrodes 18 and 20 at the given time when such lateral deflections were recorded.

Lines 75c and 75d serve to mark the beginning and ending of the intervals of time during which drilling operations are suspended and to mark the times when the logging signals are being received from the transmitting apparatus within the borehole, thereby enabling a particular group of recorded signals on chart 75a to be segregated and identified relative to the corresponding group of depth indicating recordings on chart 76.

During the time the recorder 65 is inactive and the pen 75 is at its extreme left-hand position upon the chart 75a, as before described, drilling depth progress recordings are being made by recorder 69 upon the chart 76 which is being driven continuously at a relatively constant rate with respect to time. By the action of the depth measuring device 70, as hereinbefore described, pen 71 is caused to make marks as shown at 72 for each unit increase in depth of the well borehole. For example, the marks 72 may be made for each additional foot of depth of the well borehole drilled. At the same time, during drilling operations, pen 73 is maintained in a raised position out of contact with the chart, resulting in a blank interval on the chart between the beginning and ends of lines 74. By this means the lateral deflections of the graph on the chart 75a of the recorder 65 may be correlated in time with the depth of the well borehole as indicated at 72 on the chart of the recorder 69. Thus the electrical logging measurements, as, for example, the resistance of the formations surrounding the well borehole adjacent the pick-up electrodes 18 and 20, as recorded upon the chart 75a may be correlated with the corresponding depth of the well borehole at which such measurements are taken as recorded on chart 76.

As recording wire 31 passes upward between the drums 33 and 32 in the process of actuating the signaling apparatus, as hereinbefore described, the erasing head 44 removes the signal from the recording wire 31 so that drum 32 is supplied with recording wire ready for subsequent recording of further signals as it subsequently passes downward between the drums past the recording head 30.

Following an interval of signal transmission, as hereinabove just described, and upon resumption of circulation of drilling fluid and drilling, switch 68 opens, stopping the movement of chart 75a of recorder 65 and causing pen 75 immediately to move to the left-hand edge of the chart 75a; pen 73 is raised off chart 76; switch 41 opens, deenergizing the ratchet switch 49 and the associated signaling equipment; switch 48 opens, reestablishing the resistance 39 in series with the current supply to the motor 34; and switch 38 closes, reestablishing connection between electrodes 18, 20 and the recording head 30. Under such conditions, the speed of motor 34 is reduced, thereby reducing the speed of travel of recording wire 31 from drum 32 to drum 33 to that suitable for recording the signals from recording head 30, and the process of storing the electrical logging measurements on recording wire 31 is thereby resumed.

While, for convenience of illustration, the ratchet switch 49 is shown as having a limited number of switch contact points 54 connected to a limited number of ignition filaments 56, in actual practice of the invention a large number of each is employed. Each time the drill stem is removed from the well borehole for the renewal or replacement of the drill bit, or similar operations, those signaling explosive units which have been fired during the previous signal transmission interval may be replaced. The time interval between the firing of the individual signaling charges will vary in accordance with the variations in resistivity of formations being measured. The total signaling period, however, is designed to be less than the short period of time necessary in normal operations to add a new joint of drill pipe to the drilling string. During this signaling period approximately 30 shots may be fired. Under these conditions, the number of signal charges necessary to be contained in the signal-containing portion of the drill collar 14 or 86 may be in the order of from 100 to 200 for a reasonable period of drilling.

The construction of the signaling charges and the manner of installation of such charges in the drill collar have been illustrated herein more or less schematically, since the technique of manufacture and operation of similar explosive units adapted to be subjected to high fluid pressure and high temperature within the depths of a well bore, is well known in the gun perforating art.

The present invention has been illustrated herein for convenience as applicable to electrical logging of well boreholes. This invention is, however, similarly applicable to the logging of any other type of measurement which may be made within the depths of a well borehole and which may be converted into an electrical signal or electrical potential varied in accordance with such measurement and applied through conductors corresponding to those illustrated at 26 to the signaling apparatus 21. Thus, for example, various quantities may be measured at the bottom of the well, such as pressure, temperature, radioactivity, deviation of the borehole from the vertical, natural potential, and the like, such quantities being converted by suitable electrical apparatus into a corresponding electric potential which may be applied, as hereinbefore stated, through conductors 26 to the apparatus illustrated within the dotted line enclosure 21 of Figure 1.

The terms "measure," "measuring" and "recording" of the resistance, potential, frequency, signal, or the like quantities, as employed herein in the specification and claims, are not to be limited in meaning necessarily to actual quantitative determination of such values in volts, amperes, ohms, cycles per second, or the like, but may include obtaining, utilizing, measuring, indicating, and recording relative values or variations therein or suitable functions thereof.

It is to be understood that the foregoing is illustrative only, and that the invention is not to be limited thereby, but includes all modifications thereof within the scope of the invention as defined in the appended claims.

What is claimed is:

1. Apparatus for logging a borehole comprising: a drill stem; means carried by said drill stem adjacent the lower end thereof to measure the value of a physical quantity in the borehole in which said drill stem is located; means housed in said drill stem for converting the thus-obtained measurements into a pulsating electric signal having pulsation frequencies bearing a given functional relationship to said measurements; recording means in said drill stem to make a record of said signal over a period of time; reproducing means to generate a second signal in response to the recording of said record, said second signal being similar to the first-mentioned signal, and said recording means and said reproducing means being alternately operable; means in said drill stem responsive to the said second signal for producing, in fluid in a borehole in which said drill stem is located, pressure impulses at time intervals therebetween bearing a constant functional relationship to the time intervals between pulsations of said second signal; and means manipulatable from the top of the borehole to control the alternate periods of time during which said recording means and said reproducing means are in operation.

2. Apparatus in accordance with claim 1, and means for receiving and recording, with respect to time, said pressure impulses arriving at the top of the borehole in said fluid.

3. Apparatus in accordance with claim 1, and means for recording the drilling progress of said drill stem with respect to time; means for receiving and recording, with respect to time, said pressure impulses arriving at the top of the borehole in said fluid; and means to correlate said recordings.

4. Apparatus for logging a borehole comprising: a drill stem; means carried by said drill stem adjacent the lower end thereof to measure the values of a physical quantity in the borehole in which said drill stem is located; means housed in said drill stem for converting the thus-obtained measurements into a pulsating electric signal having pulsation frequencies bearing a given functional relationship to said measurements; recording means in said drill stem to make a record of said signal over a period of time; reproducing means to generate a second signal in response to the recording of said record, said second signal being similar to the first-mentioned signal, and said recording means and said reproducing means being alternately operable; means in said drill stem responsive to the said second signal for producing, in fluid in a borehole in which said drill stem is located, pressure impulses at time intervals therebetween relatively long as compared to the time intervals between pulsations of said second signal, but with said time intervals bearing a constant functional relationship thereto; and means manipulatable from the top of the borehole to control the alternate periods of time during which said recording means and said reproducing means are in operation.

5. Apparatus in accordance with claim 4, and means for receiving and recording, with respect to time, said pressure impulses arriving at the top of the borehole in said fluid.

6. Apparatus in accordance with claim 4, and means for recording the drilling progress of said drill stem with respect to time; means for receiving and recording, with respect to time, said pressure impulses arriving at the top of the borehole in said fluid; and means to correlate said recordings.

7. Apparatus for logging a borehole comprising: a drill stem; means carried by said drill stem adjacent the lower end thereof to measure the value of a physical quantity in the borehole in which said drill stem is located; means housed in said drill stem for converting the thus-obtained measurements into a pulsating electric signal having frequencies bearing a given functional relationship to said measurements; recording means in said drill stem to make a record of said signal over a period of time; reproducing means to generate a second signal in response to the recording of said record, said second signal being similar to the first-mentioned signal, and said recording means and said reproducing means being alternately operable; means in said drill stem responsive to the said second signal for producing pressure impulses, in fluid in a borehole in which said drill stem is located, at a relatively low frequency as compared to the frequency of said second signal but bearing a constant functional relationship thereto; and means in said drill stem actuatable by variation of the rate of flow of fluid through said drill stem to control the alternate periods of time during which said recording means and said reproducing means are in operation.

8. Apparatus in accordance with claim 7, and means for receiving and recording, with respect to time, said pressure impulses arriving at the top of the borehole in said fluid.

9. Apparatus in accordance with claim 7, and means for recording the drilling progress of said drill stem with respect to time; means for receiving and recording, with respect to time, said pressure impulses arriving at the top of the borehole in said fluid; and means to correlate said recordings.

10. Apparatus for logging a borehole comprising: a drill stem; means carried by said drill stem adjacent the lower end thereof to measure the values of a physical quantity in the borehole in which said drill stem is located; means housed in said drill stem for converting the thus-obtained measurements into electric signals representative of such measurements; means to record said signals over a period of time; means for subsequently reproducing the signals from the resultant record at a rate higher than that at which they were recorded; means in said drill stem responsive to the reproduced signals for producing, in fluid in a borehole in which said drill stem may be located, pressure impulses having time intervals therebetween representative of said reproduced signals; and means manipulatable from the top of the borehole to initiate and terminate in alternate, mutually exclusive succession said periods of time during which the said signals are recorded and reproduced.

11. Apparatus in accordance with claim 10, and means for receiving and recording, with respect to time, said pressure impulses arriving at the top of the borehole in said fluid.

12. Apparatus in accordance with claim 10, and means for recording the drilling progress of said drill stem with respect to time; means for receiving and recording, with respect to time, said pressure impulses arriving at the top of the borehole in said fluid; and means to correlate said recordings.

13. Apparatus for logging a borehole comprising: a drill stem; means carried by said drill stem adjacent the lower end thereof to measure the values of a physical quantity in the borehole in which said drill stem is located; means housed in said drill stem for converting the thus-obtained measurements into electric signals representative of such measurements; means to record said signals over a period of time; means for subsequently reproducing the signals from the resultant record at a rate higher than that at which they were recorded; and means in said drill stem responsive to the reproduced signals for producing, in fluid in a borehole in which said drill stem may be located, pressure impulses having time intervals therebetween representative of said reproduced signals.

14. Apparatus for logging a borehole comprising: a drill stem; means carried by said drill stem for measuring the values of a physical quantity within a borehole in which said drill stem is located; means carried by said drill stem for converting the thus obtained measurements into a pulsating electrical signal having time intervals between pulsations bearing a given functional relationship to the values of such measurements; recording means carried by said drill stem for making a recording of said signal over a period of time; reproducing means carried by said drill stem to generate from said recording a second signal similar to the first-mentioned signal; means responsive to said second signal to produce, in the fluid in the borehole in which said drill stem is located, pressure impulses having time intervals therebetween bearing a predetermined functional relationship to the time intervals between pulsations of said second signal; and means responsive to said pressure impulses received adjacent the top of the borehole for making a record having a predetermined relationship to said time intervals between said pressure impulses and thus indicative of the measured values of said physical quantity.

15. Apparatus as defined by claim 14 in which said reproducing means includes means for generating said second signal at a predetermined higher rate than that at which the first-mentioned signal was recorded by said recording means, and in which said pressure impulse producing means includes means for producing pressure impulses at predetermined longer time intervals therebetween than the time intervals between the said pulsations of the said second signal reproduced by said reproducing means.

References Cited in the file of this patent

UNITED STATES PATENTS

| Number | Name | Date |
|---|---|---|
| 2,476,137 | Doll | July 12, 1949 |
| 2,573,137 | Greer | Oct. 30, 1951 |